United States Patent [19]
Rathert

[11] Patent Number: 5,135,351
[45] Date of Patent: Aug. 4, 1992

[54] PALLETIZED STORAGE METHOD AND APPARATUS

[75] Inventor: Horst Rathert, Minden, Fed. Rep. of Germany

[73] Assignee: Kolbus GmbH & Co. KG, Rahden, Fed. Rep. of Germany

[21] Appl. No.: 621,897

[22] Filed: Dec. 4, 1990

[30] Foreign Application Priority Data

Dec. 5, 1989 [DE] Fed. Rep. of Germany ....... 3940190

[51] Int. Cl.$^5$ .......................... B65G 57/06; B65H 3/04
[52] U.S. Cl. .................... 414/789.5; 414/416;
414/786; 414/792.6; 414/793.4; 414/796.2;
414/927
[58] Field of Search ............. 414/416, 417, 789.5,
414/791.6, 791.8, 792.6, 796, 796.2, 796.7, 786,
793.4, 927

[56] References Cited

U.S. PATENT DOCUMENTS

| 3,675,801 | 7/1972 | Larson et al. | 414/417 |
| 4,067,456 | 1/1978 | Schmitt. | |
| 4,787,810 | 11/1988 | Cawley et al. | 414/789.5 X |
| 4,988,264 | 1/1991 | Winski | 414/796.8 X |
| 4,993,915 | 2/1991 | Berger et al. | 414/792.9 X |

FOREIGN PATENT DOCUMENTS

| 95634 | 12/1983 | European Pat. Off. . | |
| 1202727 | 10/1965 | Fed. Rep. of Germany . | |
| 1756301 | 4/1970 | Fed. Rep. of Germany . | |
| 2312048 | 12/1974 | Fed. Rep. of Germany . | |
| 7608245 | 8/1976 | Fed. Rep. of Germany . | |
| 2519227 | 11/1976 | Fed. Rep. of Germany . | |
| 2521178 | 11/1976 | Fed. Rep. of Germany . | |
| 3136950 | 10/1982 | Fed. Rep. of Germany . | |
| 3107495 | 11/1982 | Fed. Rep. of Germany . | |
| 3819894 | 12/1989 | Fed. Rep. of Germany . | |
| 2203723 | 10/1988 | United Kingdom | 414/796.9 |

Primary Examiner—Robert J. Spar
Assistant Examiner—Janice Krizek
Attorney, Agent, or Firm—Chilton, Alix & Van Kirk

[57] ABSTRACT

A method of palletizing and depalletizing stacks of products in continuous, layer-by-layer succession, the products being substantially flat and thin, such as folded sheets of paper, in which a fully automatic mode of operation is achieved by depositing the stacks of a stack layer on an intercarrier in order to load a pallet. Transport elements, which are associated with a loading and unloading station, may be positioned beneath the stacks and caused to move through or into the intercarrier in order to effect the deposition on and lifting from an intercarrier of stacks which partly defines a stack layer, the stack layers and the associated intercarriers being stacked on a pallet, as a unit, and being destaked from the pallet in like manner.

18 Claims, 6 Drawing Sheets

PALLETIZED STORAGE METHOD AND APPARATUS

BACKGROUND OF THE INVENTION

1. Field of the Invention

The present invention relates to the temporary storage of products and particularly to a method of palletizing and depalletizing stacks of substantially flat and thin articles in continuous, layer-by-layer succession. More specifically, this invention is directed to the storage and recovery, during the assembly of printed publications, of folded sheets of paper and the like and especially to apparatus which permits such flat and thin products to be stored and retrieved from storage layer-by-layer and in continuous fashion. Accordingly, the general objects of the present invention are to provide novel and improved methods and apparatus of such character.

2. Description of the Prior Art

In the manufacture of books, brochures, periodicals and similar products, it is often necessary to stack large quantities of printing works products on pallets for storage pending further processing and to subsequently retrieve such products from storage. Methods and apparatus have previously been proposed which enable such printing works products, i.e., portions of printed publications, to be stacked on pallets. In the previous methods and apparatus, the unloading of the individual stacks of printing works products has commonly been mostly performed by hand. This hand unloading is an extraordinarily labor intensive endeavor, and thus costly, and also demands heavy physical effort. Furthermore, a persistent problem results from the fact that the individual printing works products that are brought together to form stacks cannot be prevented from shifting relative to one another, especially during hand unloading.

As an example of the prior art, in order to load a book assembling machine, a stacker truck is utilized for transporting the stacks of folded printed sheets, which have been temporarily stored on pallets, from the in-process storage area to the feeding or loading apparatus of the assembling machine. When the pallet bearing the stacks of folded printed sheets reaches the assembling machine, an operator must unload the pallet and feed the individual stacks of printed sheets to the assembling machine by hand. This is an extremely difficult and tiring job and it is virtually impossible to perform the job without the shifting, and subsequent disordering, of the printing works products.

For an example of prior art apparatus for loading printing works products onto pallets in layers, reference may be had to published German Patent Application 31 07 495. This published application discloses a system for depositing stacks of printed newspaper or book pages, or other similar printed matter, on a pallet so that the thin flat products in question are aligned in a specific direction. The apparatus of the published application operates on the push-off principle and includes a sliding platform onto which an assembled group of the products is transferred by means of a pusher element. The sliding platform, after being loaded, moves to a position above the pallet and, after a push-off element has been lowered behind the group of products, the sliding platform is lowered to a level which is adjacent a layer of products already present and then retracted beneath the push-off elements. The end result is that the group of products is swept off onto the pallet or onto a layer of products which has already been deposited on the pallet during platform retraction.

In stacking appliances of the type generally described above which utilize a sliding platform and a cooperating push-off element, the overall height of the platform structure results in a relatively large difference in height between the supporting surface of the platform and the top of the pallet or the top of the layer of products already present on the pallet. Due to this height difference, the products being stacked drop through a relatively large distance when being swept off the sliding platform. This relatively long free fall unavoidably leads to the products, which have been precisely aligned on the sliding platform in a predetermined collective arrangement conforming to a defined stacking order, losing the predetermined collective arrangement. This disordering is most prevalent when the products, i.e., the book pages or the like, are thin. That is, there is particular risk that very thin printing works products will slide over one another with the result that an unstable stack will be formed. Since it is seldom possible to perform an aligning operation once stacking has been completed, serious alignment problems are encountered during destacking.

Continuing with the above discussion, as a result of the friction that occurs between the products and the supporting surface as the products are being pushed sideways onto the sliding platform of the prior art stacking appliances, the same friction being encountered when the products are pushed off the platform, prior art palletizing installations are incapable of meeting the requirement that products which are highly susceptible to damage, such as stacked portions of books or brochures, be treated with exceptional gentleness.

SUMMARY OF THE INVENTION

The present invention overcomes the above-briefly discussed and other deficiencies and disadvantages of the prior art by providing a novel and improved method for palletizing and depalletizing stacks of substantially flat, thin products. The present invention also encompasses apparatus for use in the practice of such method, the said apparatus being capable of palletizing and depalletizing, in a fully automatic fashion, folded sheets of paper, and portions of periodicals, books, brochures or the like. The method and apparatus of the present invention guarantee the preservation of the mutual alignment of the products in a stack and the alignment of stacks of such products which are grouped to form a row. The method and apparatus of the invention also ensure that the products in question are treated gently during both loading and unloading.

In achieving the above-mentioned general objectives, the present invention comprises the deposition on an intercarrier of the stacks of printing works products. The thus loaded intercarriers are stacked to load a pallet. The subsequent unloading of a pallet, in accordance with the invention, comprises the lifting, from an intercarrier, of said stacks with the intercarriers being removed from the pallet in layer-by-layer fashion. The intercarrier loading and unloading operations are performed by transport elements which are associated with a loading and unloading station, i.e., a translator. These transport elements position themselves beneath a stacked intercarrier, and move through or into the intercarrier in order to effect deposition or lifting of product stacks. Furthermore, in accordance with another feature of the present invention, the stacks are deposited on the intercarriers in rows and are lifted from the intercarriers in rows, the intercarriers being conveyed through the loading and unloading station in a stepwise manner.

Apparatus in accordance with the invention, for implementing the above-described novel method, comprises intercarriers which receive the stacks of printing works products to be stored. The intercarriers have laterally projecting edges which enable them to be engaged from below. The intercarriers are, in a first embodiment of the invention, also provided with regularly spaced lengthwise slots through which conveying elements associated with the translator may be moved. Vertical movement may be imparted to the translator so as to deposit stacks or stack rows on the intercarrier and to lift products therefrom. Apparatus in accordance with the invention further comprises a transport arrangement for transferring the individual intercarriers, in a stepwise manner, into the zone in which the translator operates and for positioning the lengthwise slots of the intercarriers in registration with the conveying elements of the translator.

The present invention accomplishes the fully automatic palletizing and depalletizing of stacks of substantially flat, thin products, folded sheets of paper or the like for example, without changes in the positions of the stacks or the slipping of the individual layers of the stacks relative to one another. The above result, in part, is a function of the fact that the stack rows are deposited on an intercarrier during loading and are lifted from the intercarrier during unloading rather than being directly supported on a pallet. The use of the intercarriers also ensures that a stable pallet stack is formed thus enabling in-works transportation.

BRIEF DESCRIPTION OF THE DRAWINGS

The present invention will be better understood and its numerous objects and advantages will become apparent to those skilled in the art by reference to the accompanying drawings wherein like reference numerals refer to like elements in the several figures and in which.

DESCRIPTION OF THE DISCLOSED EMBODIMENT

With reference now to the drawings, apparatus for loading stacks $1a$ of printing works products onto pallets 3, and also for unloading such stacks from the pallets, in accordance with the present invention is shown schematically. The present invention makes use of intercarriers 2 on which rows 1 of the stacks $1a$ are deposited and from which the stacks are retrieved. An intercarrier 2 for use with the embodiment of FIGS. 1-5 may clearly be seen by reference to FIG. 6.

Figure 1:
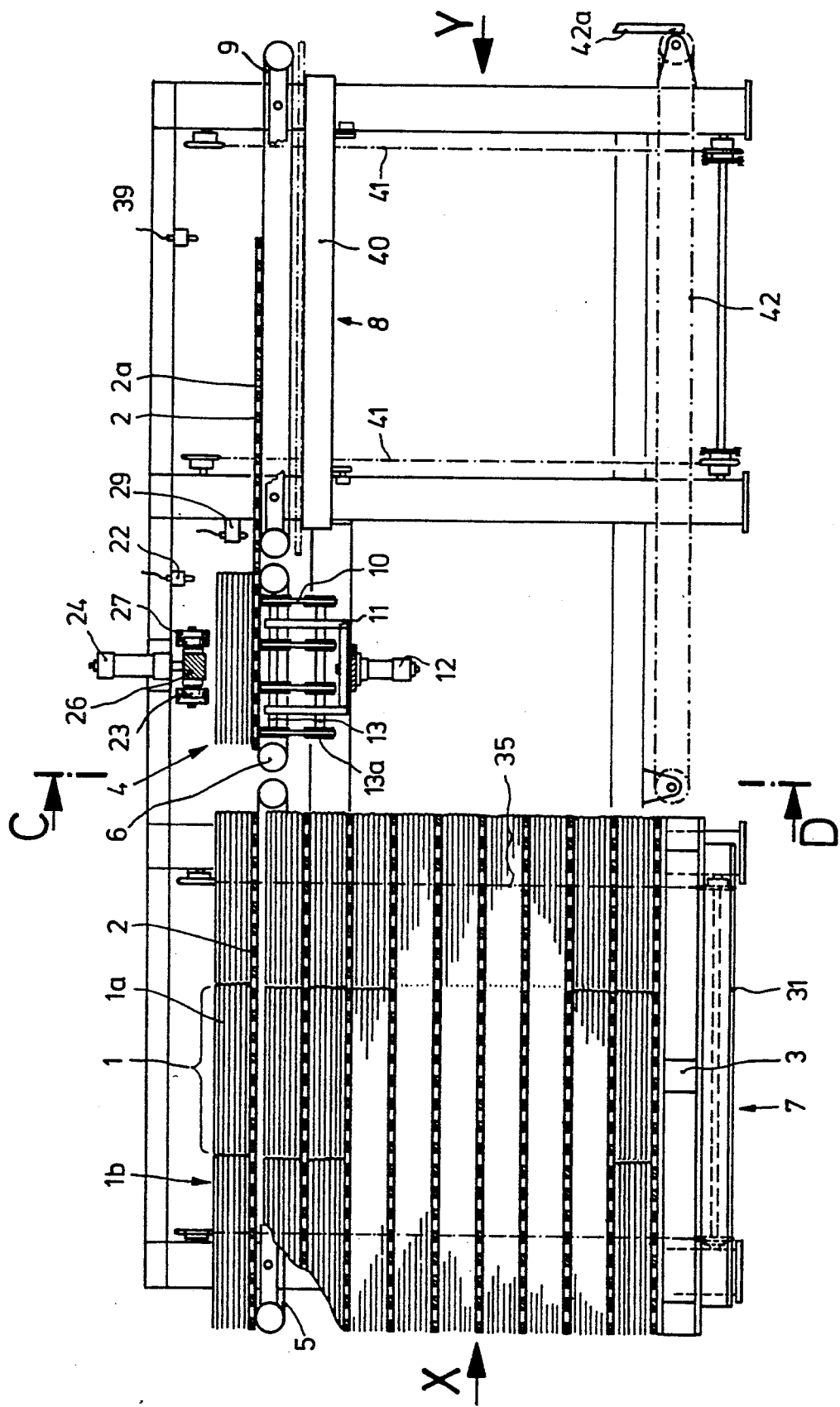
FIG. 1 is a cross-sectional, schematic side elevation view of apparatus in accordance with the invention, FIG. 1 being a view taken along plane A-B of FIG. 2.
Figure 3:
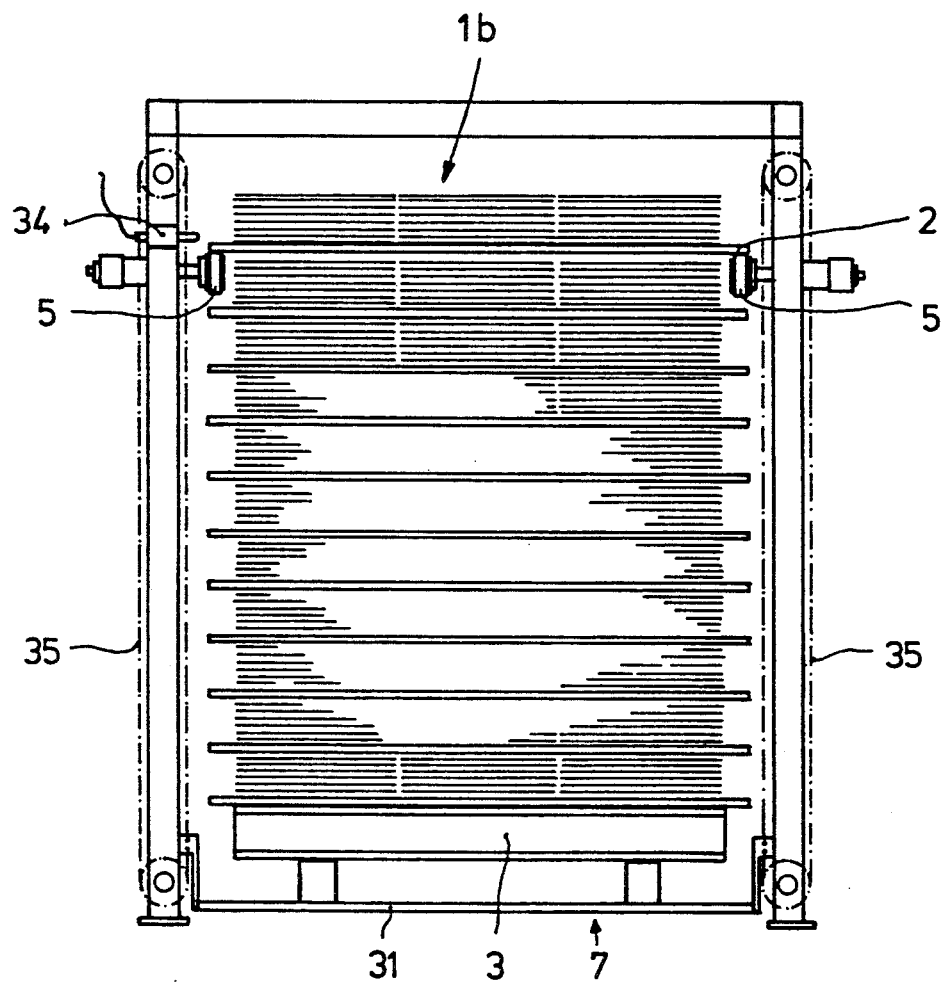
FIG. 3 is an end view, taken in the direction of arrow X of FIG. 1, of the apparatus of FIGS. 1 and 2.
Figure 4:
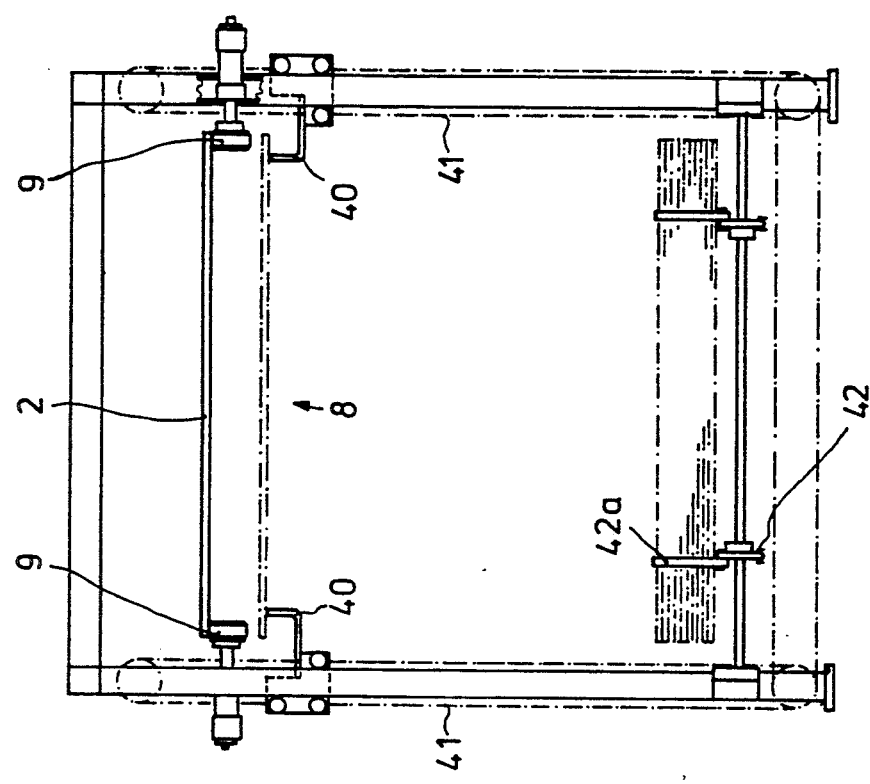
FIG. 4 is a view similar to FIG. 3 but taken in the direction indicated by arrow Y on FIG. 1.

The intercarriers 2 are dimensioned to project laterally beyond the stacked products The stacked products are formed into layers, as indicated generally at $1b$ in FIGS. 1 and 3, and each layer includes an intercarrier. This permits the intercarriers to be engaged from below, as indicated in the case of the uppermost intercarrier in FIGS. 1 and 3, so that they can be moved between the pallet loading position and a translator assembly 4. The intercarriers 2 are provided with spaced slots $2a$ which extend transversely to the direction of intercarrier movement when being shifted between the pallet loading position and the translator. The translator 4 includes belts 10 which are dimensioned to pass through the slots $2a$ to engage a row of stacks $1a$ of printing work products on an intercarrier. In order to permit the engagement of the belts 10 with a stack $1a$, the translator 4 is vertically movable and, of course, the spacing between the belts 10 corresponds to the spacing of the slots $2a$ of the intercarriers.

The translator 4 includes a lifting frame 11 operated by fluidic actuators 12. Bearing shafts 13, with associated pulleys $13a$, are mounted in frame 11 and the belts 10 pass about the pulleys $13a$. The belts are driven by a motor 15, the output shaft of motor 15 being coupled to one of the pulley shafts via an articulated drive shaft 16 and gearing 17. In order to prevent sagging, the upper runs of the belts 10 are supported on rails 18 as shown in FIG. 5.

Figure 5:
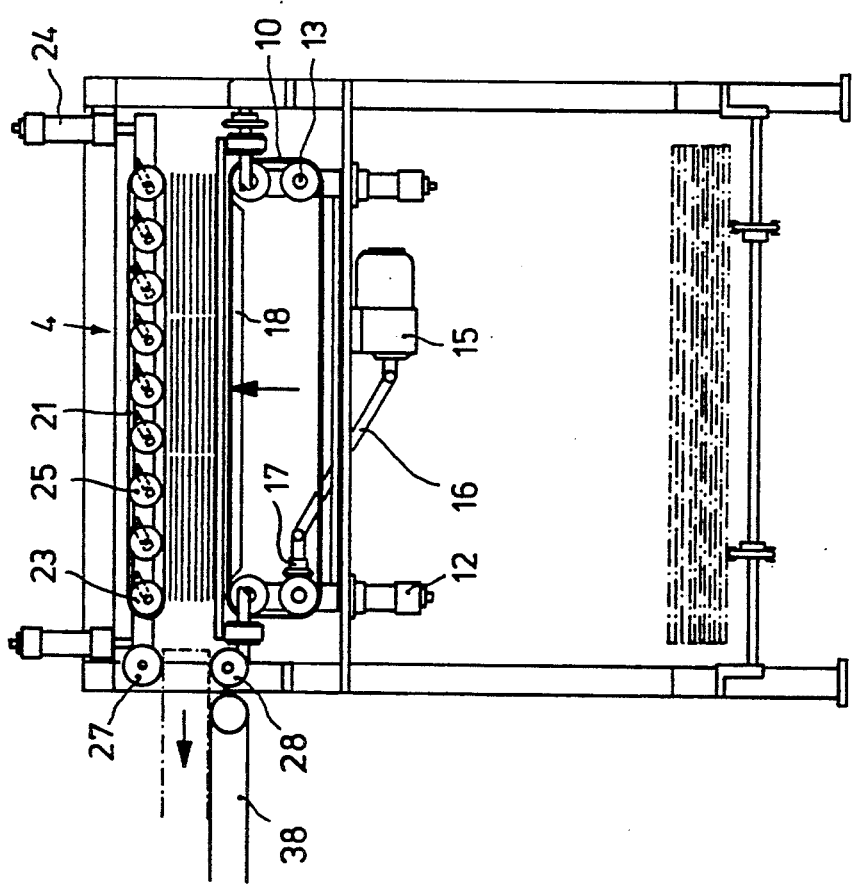
FIG. 5 is a cross-sectional view of the translator portion of the apparatus of FIGS. 1-4, FIG. 5 being taken along plane C-D of FIG. 1.
Figure 6:
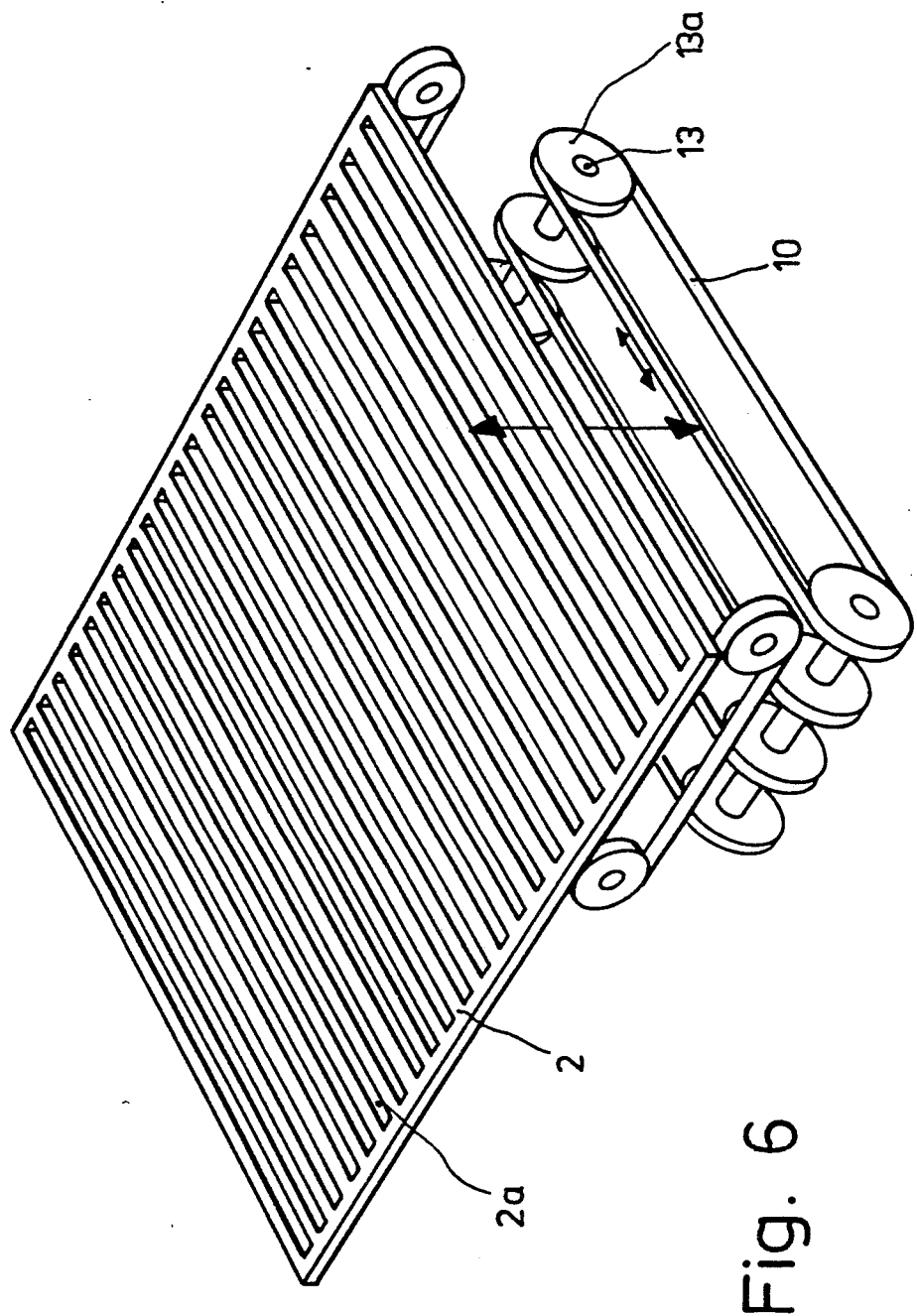
FIG. 6 is a perspective view of a first embodiment of an intercarrier for use in the practice of the present invention, the intercarrier being shown in juxtaposition to a portion of the translator assembly of FIG. 5.

Continuing to refer to FIG. 5, in conjunction with FIG. 1, the translator 4 is equipped with an upper belt system consisting of parallel belts 21. The belts 21 pass about reversing conveyor wheels 23 which may be driven at variable speeds. A plurality of resiliently mounted support rollers 25 are positioned between the conveyor wheels 23. The wheels 23 and rollers 25 are carried by a beam 26. The opposite ends of beam 26 are connected to the piston shafts of a pair of fluidic actuators 24 and thus beam 26 and the belts 21 may be lowered so as to enable the belts to contact a stack $1a$, or plural stacks which define a stack row 1, on an intercarrier located at the translator. The complete upper belt system which includes the belts 21 may be adjusted relative to the machine frame as a function of the height of the stacks $1a$. In the case where the printing works products being handled are thin, and thus have a tendency to shift relative to one another, it may be necessary or desirable to provide for the belts 21 to be motor-driven in synchronism with the driving of the lower belts 10.

A pair of freely rotatable pressure rollers 27 are mounted at one end of the beam 26. Rollers 27 cooperate with a motor driven accelerating roller 28 to shift the stacks $1a$ to and from a conveyor belt 38 which delivers printing works products to and receives such products from the translator.

Figure 2:
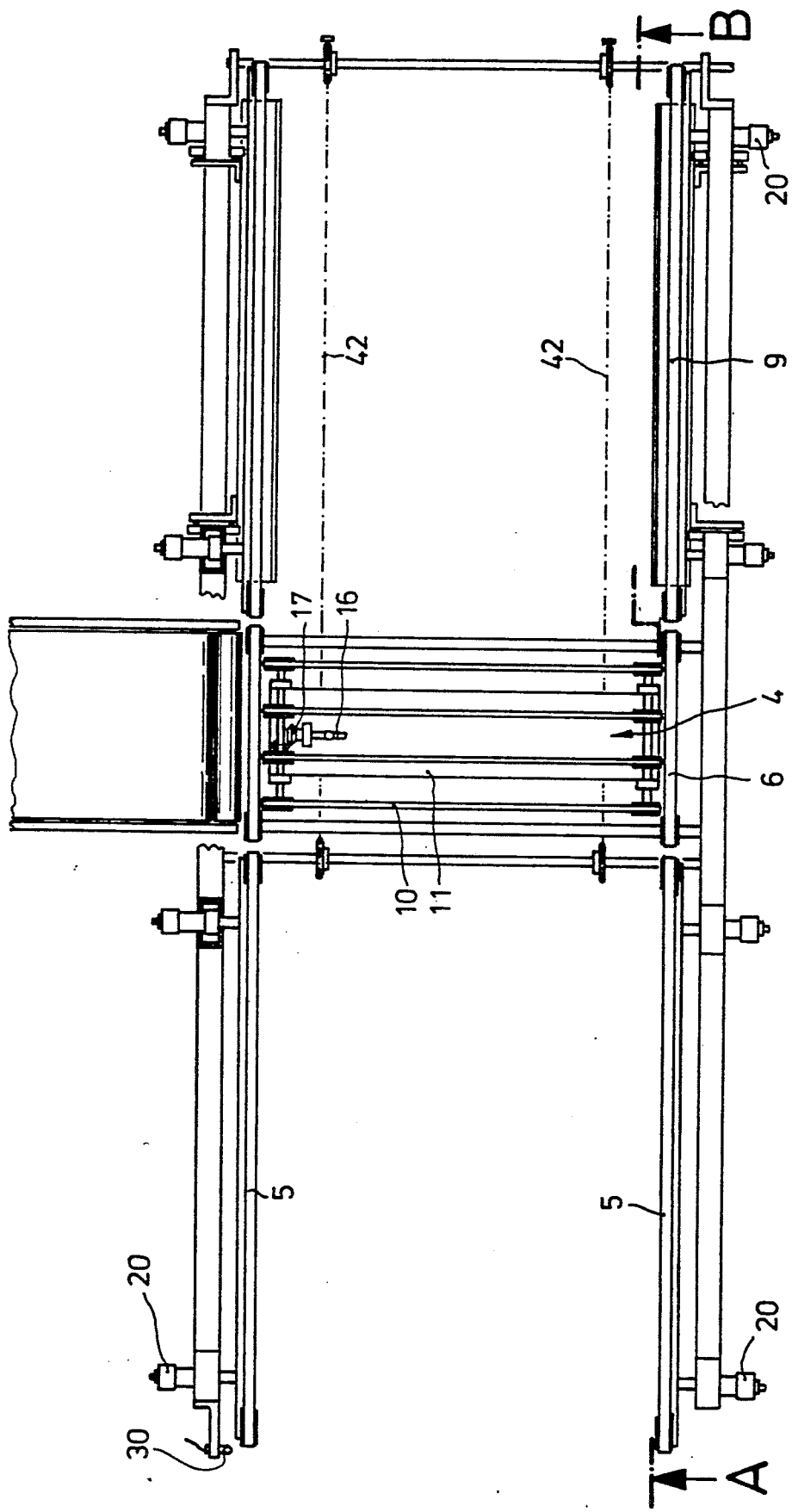
FIG. 2 is a top plan view of the apparatus of FIG. 1.

As may most clearly be seen from FIG. 2, the translator 4 is situated between the parallel belts of an intermediate conveyor 6. The belts of intermediate conveyor 6 are spaced apart sufficiently so as to not impede the vertical movement of the translator. A pair of conveyors 5 and 9 are respectively located to either side of intermediate conveyor 6 at the same level as conveyor 6. The conveyor 5 is positioned above a pallet lifter, indicated generally at 7, while the conveyor 9 is positioned above an intercarrier lifter, indicated generally at 8. In the disclosed embodiment, conveyors 5, 6 and 7 are all driven by a common motor, not shown.

The endless belts of conveyors 5 and 9 may be spaced to engage, and thus support, the intercarriers 2 in regions thereof which project beyond the stack rows 1 as may best be seen from FIG. 3. The lateral spacing between the parallel belts which define each of the conveyors 5 and 9 can be varied by means of fluidic actuators 20 thus permitting the conveyors to selectively acquire or relinquish an intercarrier 2.

It should be noted that, if deemed necessary, one or more upper belt systems, similar to the belt system mounted on the beam 26 of the translator, can be provided above the pallet lifter 7 to clamp the products thus ensuring against a relative slippage during movement of an intercarrier 2 to or from the translator 4.

The process of unloading a pallet 3 which has been employed to store stacks 1a of printing works products, for example folded sheets of paper, will now be described. The stacks 1a will have been formed on the intercarriers 2 in plural stack rows 1 and the intercarriers with their loads stacked on a pallet 3. When retrieval of the printing works products from storage is required, a pallet 3, on which a vertical stack of loaded intercarriers resides, will be moved onto the lifting plate 31 of the pallet lifter 7. The pallet will be properly aligned, both laterally and longitudinally, and the lifting plate and loaded pallet then raised by motor driven chains 35. As the pallet is raised, the uppermost intercarrier 2 will pass between the opened belt-runs of the top-mounted run-in conveyor 5. Referring to FIG. 3, the raising of the pallet will be terminated when a sensor 34, which may be a photoelectric device, "sees" the intercarrier 2 carrying the top stack layer 1b. At this time, the uppermost intercarrier 2 will be situated above the run-in conveyor 5. The actuators 20 will then be operated to cause the spacing between the belts of conveyor 5 to be reduced such that the belts are positioned beneath the outer edges of the intercarrier. The pallet 3 is then lowered through a preset distance in order to deposit the intercarrier on the conveyor 5. At this time, as may be seen from FIGS. 1 and 3, a clearance will be created between the top intercarrier and the stack layer 1b situated beneath it.

When the uppermost intercarrier 2 has been properly engaged by conveyor 5, all three of conveyors 5, 6 and 9 will be activated and the intercarrier 2 will be moved, to the right as the apparatus is depicted in FIG. 1, so as to be partly in registration with translator 4. The uppermost intercarrier 2 and the rows 1 of stacks 1a will move as a unit and this movement will continue until the leading edge of the first stack row 1 is detected by a sensor 22. The position of sensor 22 is format-dependent and will be altered as a function of the printing works products being handled. The precise alignment of the lengthwise slots 2a in the intercarrier 2, relative to the belts 10 of translator 4, is then effected through the employment of a further sensor 29, which will typically be a photoelectric device, which "looks" through a slot 2a in the intercarrier.

Once the intercarrier 2 has been positioned, the lifting frame 11 with the belts 10 will move upwardly so as to cause the belts 10 to pass through the slots 2a in the intercarrier. The upward movement of the frame 11 will typically be terminated when the upper surfaces of the belts 10 are located approximately 10mm above the intercarrier. As they move upwardly, the belts 10 of translator 4 will acquire a stack row 1 and lift it from the intercarrier 2. In the typical case, the upward movement of the frame 11 and belts 10 is synchronized with downward movement of the beam 26 and the belts 21 carried thereby. Subsequently, driven by motor 15, the belts 10 of translator 4 will convey the stack row 1 transversely to the run-in direction with stacks 1a clamped between the belts 10 and 21. The transverse movement of the stack row 1 brings the stacks 1a comprising the row sequentially into the operating region of accelerating rollers 28 and cooperating pressure rollers 27. Accordingly, the individual stacks 1a will be transferred onto the discharge conveyor belt 38 spaced at defined, periodically repeating intervals.

When the sensor 22 detects that a complete row 1 of stacks 1a has been removed from the intercarrier 2, the drive for belts 10 is deenergized, the frame 11 lowered, and the intercarrier 2 is moved in the direction of intercarrier lifter 8 by energizing conveyors 5, 6 and 9. This movement "steps" the intercarrier forward until the sensor 22 detects the presence of the leading edge of the next stack row 1. The above-described operating sequence will be repeated as many times as there are stack rows 1 on an intercarrier 2.

As a result of the intercarrier 2 moving through the translator 4 in a succession of steps, it arrives on the belts of the run-out conveyor 9 which is located above the intercarrier lifter 8. A sensor 39, which may also be a photoelectric device, senses the presence of a leading edge of an intercarrier 2 thus providing an indication that the intercarrier 2 which is being unloaded has cleared the pallet lifter 7. The signal from sensor 39, accordingly, will be employed to initiate the above-discussed lifting sequence which results in the presentation of a fresh intercarrier 2 with its stack layer 1b on conveyor 5 while the last stack row 1 on the preceding intercarrier is leaving the translator 4. Thus, with an intercarrier in the position depicted in FIG. 1, the run-in conveyor 5 will open, the pallet will be raised, the conveyor will close and the pallet will descend to deposit a loaded intercarrier 2 on the belts of conveyor 5.

Immediately after the last stack 1a of the last stack row 1 on an intercarrier has been discharged from translator 4, infeeding of the next loaded intercarrier begins and the emptied intercarrier will move to the position where it is located entirely within the confines of intercarrier lifter 8. When the emptied intercarrier 2 reaches its limit of travel, the conveyor 9 will open and angle-section support elements 40, mounted on motor driven lifting chains 41, will be moved upwardly into contact with the intercarrier. The top of the stack of intercarriers 2 in the intercarrier lifter 8 is monitored by a sensor, not shown, which ensures that lowering of the stack of intercarriers occurs in a stepwise manner.

Once destacking has been completed, i.e., all the loaded intercarriers 2 have been removed from the pallet 3 layer-by-layer, the lifting plate 31 of the pallet lifter 7 will be situated, with the empty pallet, at the upper travel limit. When the last intercarrier 2 is acquired by the run-in conveyor 5, the lifting plate 31 will descend to its lower travel limit. At this time, the intercarrier lifter 8 will also descend to its lower travel limit. When the intercarrier lifter 8 reaches its lower limit of travel, it deposits the stack of intercarriers on a near-floor conveyor 42. The conveyor 42 includes pusher dogs 42a which are fastened to the belts of the conveyor. These pusher dogs will engage the stack of intercarriers and move it onto the empty pallet 3. The intercarrier lifter 8 will then return its upper travel limit while the pallet 3 with a stack of empty intercarriers will be removed from the pallet lifter 7 for storage.

The unloading of the last intercarrier 2 will be performed during the above-discussed change sequence. A fresh pallet, with layers of intercarriers supporting rows of stacked printing works products, may be moved into position on the lifting plate 31 of the pallet lifter 7, and properly aligned, during the unloading of the last intercarrier 2 so that a new operating sequence may be manually initiated.

The loading of a pallet 3 with stacks 1a of printing works products, for example folded sheets of paper, is performed in essentially the reverse sequence to the unloading procedure described above. The pallet lifter 7 raises an empty pallet 3 to the upper travel limit, the intercarrier lifter 8 is hand loaded with an adequate stack of intercarriers 2 and, with the conveyor 9 above the intercarrier lifter 8 in the open position, the stack of intercarriers is raised so that the top intercarrier 2 arrives at a position above conveyor 9. In this raised position, the top intercarrier will be engaged and positively held by clamping elements which are controlled by suitable actuators, the clamping elements and their actuators being omitted from the drawings. The intercarrier lifter 8, with its stack of intercarriers supported thereon, will then be lowered a predetermined distance. The conveyor 9 is subsequently closed and the clamping elements release the intercarrier 2 onto the conveyor belts. Intercarrier 2 is then transported, in a first stepwise movement, towards the translator 4 until the trailing edge thereof is detected by sensor 39. At this point the movement of the intercarrier is temporarily halted and the precise positioning of the slots 2a of the intercarrier relative to the translator belts 10 is accomplished. Next, the belts 10 are raised through the slots 2a of intercarrier 2 and the stacks 1a of printed work products, arriving on the belt 38, are transferred via the cooperating rollers 27, 28, onto the intercarrier. The individual stacks 1a of a stack row 1 are delivered, via rollers 27 and 28, onto the belts 10 in such a manner that the stacks assume positions in the translator which are spaced from one another by a desired interval defined by the intercarrier width.

Once a stack row has been formed on the intercarrier 2 which is being loaded, the sensor 22 will provide a control signal which deenergizes the drive for belts 10 and acceleration roller 28. The frame 11, and thus belts 10, will then be lowered to deposit the stack row on the intercarrier 2 and the intercarrier will be stepped to the left by energizing the conveyors 5, 6 and 9. This results in the stack row 1 which has been placed on the intercarrier being moved out of the translator 4, i.e., the intercarrier will be repositioned such that the already received stack row is not situated within the translator run-in zone. The inflow of stacks of printing works products arriving on the belt 38 is halted while the intercarrier 2 is being repositioned relative to translator 4.

When the intercarrier 2 has been positioned to receive the final stack row 1 at translator 4, a fresh intercarrier will arrive on conveyor 9 above the intercarrier lifter 8 so that the empty intercarrier can be positioned to receive stack rows immediately following completion of loading of the previous intercarrier.

When the intercarrier being loaded has received the last stack row, the conveyors 5, 6 and 9 will be energized such that the loaded intercarrier 2 will be transported to a position above a pallet 3 in the pallet lifter 7.

The limit of motion toward the pallet lifter 7 of a loaded intercarrier will be defined by a light barrier or other suitable sensor 30. Through operation of the actuators 20, the conveyor 5 will be opened to release the loaded intercarrier 2 and, at the same time, the pallet 3 is raised slightly to ensure that there is no weight on the conveyor at the time of release of the intercarrier. Immediately after release of the intercarrier by conveyor 5, the pallet will be moved down to the next receiving level as defined by a sensor.

Stack layer after stack layer is deposited on the pallet 3, each with its intercarrier 2, until the pallet reaches its lower travel limit and a complete load unit is thus formed. The full pallet 3 is then moved out of pallet lifter 7 while the loading of an empty intercarrier 2 continues. Thus, the angle-section support elements 40 on the lifting chains 41 of the intercarrier lifter 8 are lowered to receive a fresh stack of intercarriers, and a fresh, empty pallet 3 is fed to the pallet lifter 3. The palletizing process can proceed continuously with the pallet lifter 7 and intercarrier lifter 8 moving their respective loads to their upper travel limits. The change sequence, i.e., the delivery of a new pallet and a stack of intercarriers, is performed while a complete stack layer 1b is being formed an intercarrier 2.

Figure 7:
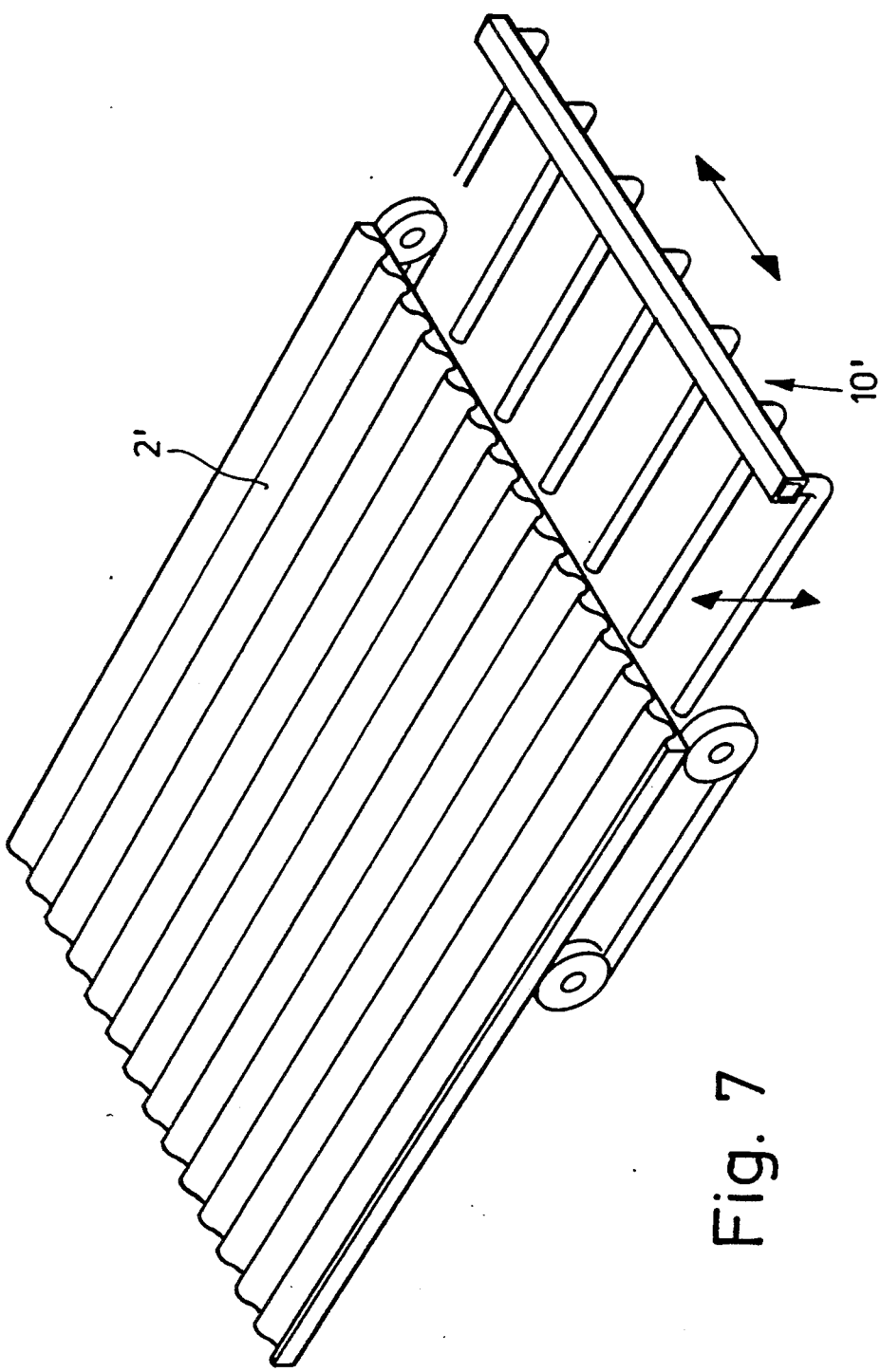
FIG. 7 is a view similar to FIG. 6 showing a modified intercarrier for use in the practice of the present invention.

The intercarrier 2' illustrated in FIG. 7 is utilized in a modified embodiment of the invention. In the FIG. 7 embodiment, the supporting surface of the intercarrier has a corrugated shape. In such embodiment, the translator is provided with a rake-shaped lifter 10, which replaces the belts 10 of FIGS. 1–6. The rake 10, will be movable in horizontal and vertical planes as indicated by the arrows on FIG. 7.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method of palletizing stacks of flexible products in continuous, layer-by-layer succession, the products being substantially flat and thin, said method comprising the steps of positioning an intercarrier at a transfer station, the intercarrier having openings which are sized and spaced to receive movable lifting elements associated with the transfer station, causing the lifting elements to pass through openings in the intercarrier whereby load supporting surfaces of the lifting elements will be disposed adjacent to and above a load supporting surface of the intercarrier, depositing at least a first stack of products on the lifting elements, causing relative movement between a stack supported on the lifting elements and the intercarrier to cause the stack to be positioned relative to the intercarrier support surface, transferring the positioned stack of products to the intercarrier, the transfer of the stack to the intercarrier being accomplished by causing the lifting elements to be withdrawn from the intercarrier openings to thereby establish contact between the intercarrier load supporting surface and the bottom of the stack whereby disengagement of the lifting elements from the bottom of the stack will occur and the stack will be supported on the intercarrier, the method also comprising moving intercarriers with stacks supported thereon from the transfer station, the moving of an intercarrier with stacks supported thereon including engaging the intercarrier only at edge regions thereof, which edge regions do not include the openings, and stacking the thus moved intercarrier on a pallet, a plurality of intercarriers being stacked on a single pallet for storage of the products.

2. The method of claim 1 wherein the products are placed on the intercarriers in rows of stacks and are removed from the intercarriers in rows of stacks.

3. Apparatus for palletizing and depalletizing stacks of substantially flat and thin flexible printing works products, said apparatus comprising intercarriers which receive and support the stacks, said intercarriers with at least a first stack of printing works products supported thereon being stackable in a vertical column, said intercarriers having laterally projecting edges, said intercarriers also having regularly spaced openings, said openings being substantially parallel with one another and extending at least the length of a stack support area on the intercarriers, a translator having lifting elements, said lifting elements being dimensioned to pass into said intercarrier openings and to support a stack by contacting the bottom of the stack along its entire length, drive means for imparting movement to said translator lifting elements relative to an intercarrier whereby at least a first stack supported on said lifting elements may be deposited on an intercarrier and a stack supported on the intercarrier may be lifted therefrom, said apparatus further comprising transport means for transferring an individual intercarrier, in a step-wise manner, into the zone in which said translator operates, said transport means also positioning the lengthwise openings of the intercarriers relative to the lifting elements of said translator, said transport means supporting the intercarriers near their said laterally projecting edges so as to permit free movement of said translator lifting elements.

4. The apparatus of claim 3 wherein the intercarrier openings comprise through-slots and wherein said lifting elements of said translator consist of parallel lower belts which are spaced at distances matched to intervals between the lengthwise slots of the intercarriers.

5. The apparatus of claim 4 wherein said translator further comprises first upper belt means, said first upper belt means comprising vertically movable holding-down belts which come into contact with stack supported on said parallel lower belts.

6. The apparatus of claim 5 wherein the holding-down belts are drivable in synchronism with said parallel lower belts.

7. The apparatus of any one of claims 4 to 6 wherein an accelerating roller is provided on a first side of said translator, said accelerating roller being drivable at a speed higher than the speed at which the belts of said translator are circulating, and wherein said translator further comprises a pair of pressure rollers which cooperate with said accelerating roller and means for bringing said pressure rollers into functionally effective association with said accelerating rollers by imparting vertical movement to said pressure rollers.

8. The apparatus of claim 7 wherein said accelerating roller is drivable at variable speeds.

9. The apparatus of any one of claims 3 to 6 wherein said transport means transfers the intercarriers into the zone in which said translator operates and comprises an intermediate conveyor and a further pair of conveyors which are installed at the same level as said intermediate conveyor, said apparatus further comprising pallet lifter means for lifting pallets to the level of said further pair of conveyors and intercarrier lifter means for lifting intercarriers to the level of said further pair of conveyors, one conveyor of said further pair of conveyors being situated above said pallet lifter, and the other conveyor of said further pair of conveyors being situated above said intercarrier lifter, said conveyors of said further pair of conveyors being drivable by a common motor in a manner such that they execute step-wise movements.

10. The apparatus of claim 9 wherein said conveyors of said further pair of conveyors each comprise a pair of cooperating conveyor belts and wherein said apparatus further comprises means for varying the spacing between said cooperating belts in order to produce an opening and closing action for acquiring or relinquishing an intercarrier.

11. The apparatus of claim 10 wherein said pallet lifter is controlled such that the uppermost intercarrier of a stack of intercarriers may be lifted above the level of the cooperating belts of said one conveyor whereby said upper most intercarrier may be acquired or relinquished by said cooperating belts of said one conveyor.

12. The apparatus of claim 9 further comprising clamp means positioned above said pallet lifter, said clamp means including belt means and being vertically moveable to establish contact with a stack of printing works products on an intercarrier, said clamp means belt means being drivable in synchronism with said conveyors of said further pair of conveyors.

13. The apparatus of claim 3 wherein said intercarriers have a supporting surface in the form of a length of corrugated sheet material, said lengthwise openings being defined by corrugations and wherein said lifting elements comprise a rake-shaped member which includes a plurality of prongs, the separation between the prongs of said rake-shaped member being equal to a multiple of the spacing between the corrugations whereby said prongs may be inserted into said corrugations and then raised or lowered.

14. The apparatus of claim 13 wherein said transport means transfers the intercarriers into the zone in which said translator operates and comprises an intermediate conveyor and a further pair of conveyors which are installed at the same level as said intermediate conveyor, said apparatus further comprising means for lifting pallets to the level of said further pair of conveyors and means for lifting intercarriers to the level of said further pair of conveyors, one conveyor of said further pair of conveyors being situated above said pallet lifting means, and the other conveyor of said further pair of conveyors being situated above said intercarrier lifting means, said conveyors of said further pair of conveyors being drivable by a common motor in a manner such that they execute step-wise movements.

15. The apparatus of claim 14 wherein said conveyors of said further pair of conveyors each comprise a pair of cooperating conveyor belts and wherein said apparatus further comprises means for varying the spacing between said cooperating belts in order to produce an opening and closing action for acquiring or relinquishing an intercarrier.

16. The apparatus of claim 9 wherein an accelerating roller is provided on a first side of said translator, and wherein said translator further comprises a pair of pressure rollers which cooperate with said accelerating roller and means for bringing said pressure rollers into functionally effective association with said accelerating roller by imparting vertical movement to said pressure rollers.

17. The apparatus of claim 16 wherein said apparatus further comprises clamp means positioned above said pallet lifter, said clamp means comprising a belt and being vertically moveable to establish contact between said clamp means belt and the top of a stack of printing works products on an intercarrier, said clamp means belt being drivable in synchronism with said conveyors of said further pair of conveyors.

18. The apparatus of claim 17 wherein said pallet lifter is controlled such that the uppermost intercarrier of a stack of intercarriers may be lifted above the level of the cooperating belts of said one conveyor whereby said upper most intercarrier may be acquired or relinquished by said belts of said one conveyor.

* * * * *